US012756249B2

(12) United States Patent
Wang et al.

(10) Patent No.: US 12,756,249 B2
(45) Date of Patent: Oct. 6, 2026

(54) MOTOR ROTOR STRUCTURE AND MOTOR

(71) Applicant: Splash Pool & Spa, Inc., Ningbo City (CN)

(72) Inventors: Huaiping Wang, Ningbo City (CN); Hongliang Yang, Ningbo City (CN); Haidong Ye, Ningbo City (CN); Wenfeng Ge, Ningbo City (CN)

(73) Assignee: SPLASH POOL & SPA, INC., Ningbo City (CN)

( * ) Notice: Subject to any disclaimer, the term of this patent is extended or adjusted under 35 U.S.C. 154(b) by 195 days.

(21) Appl. No.: 18/509,809

(22) Filed: Nov. 15, 2023

(65) Prior Publication Data

US 2024/0162768 A1 May 16, 2024

(51) Int. Cl.
*H02K 1/2706* (2022.01)

(52) U.S. Cl.
CPC ....... *H02K 1/2706* (2013.01); *H02K 2201/06* (2013.01); *H02K 2201/15* (2013.01)

(58) Field of Classification Search
CPC .. H02K 2201/06; H02K 1/15; H02K 2213/03; H02K 1/24; H02K 1/26; H02K 1/27
See application file for complete search history.

(56) References Cited

U.S. PATENT DOCUMENTS 7,180,217 B2 2/2007 Nakayama et al.
8,334,627 B2 12/2012 Koyanagi
9,184,648 B2 * 11/2015 Taniguchi .............. H02K 29/03
9,966,804 B2 5/2018 Yu et al.
2009/0267437 A1 * 10/2009 Chai .................... H02K 1/2781 310/156.25
2015/0035402 A1 * 2/2015 Reddy .................... H02K 21/16 310/156.01

(Continued)

FOREIGN PATENT DOCUMENTS

CN 101651370 2/2010
CN 107919750 A * 4/2018 ............ H02K 1/274

(Continued)

OTHER PUBLICATIONS

CN-107919750-A Machine Translation (Year: 2018).*
CN-217720984-U Machine Translation (Year: 2022).*
CN-116526712-A Machine Translation (Year: 2023).*

*Primary Examiner* — Oluseye Iwarere
*Assistant Examiner* — Masoud Vaziri
(74) *Attorney, Agent, or Firm* — ALLEN, DYER, DOPPELT +GILCHRIST, P.A.

(57) ABSTRACT

A motor rotor structure includes a rotor irone core composed of a rotor section. The circumference of the rotor section is uniformly distributed with magnetic tile grooves. The magnetic tile grooves are located near the axis of the rotor section, and there are two limit edges that contract towards the axis of the rotor section. The two limit edges are connected to two convex edges extending towards the periphery of the rotor section. Between the two convex edges, there are limit protrusions that protrude towards the periphery of the rotor section. A limiting protrusion enables the permanent magnet to be stably placed in the magnetic tile groove, limiting its displacement during rotation and maintains the stability of the motor.

5 Claims, 4 Drawing Sheets

(56) References Cited

U.S. PATENT DOCUMENTS

| | | | | |
|---|---|---|---|---|
| 2015/0162790 | A1* | 6/2015 | Isoda | H02K 1/2766 310/156.47 |
| 2015/0244218 | A1* | 8/2015 | Kaufmann | H02K 1/28 310/156.58 |
| 2023/0137883 | A1* | 5/2023 | Lee | H02K 1/2773 310/156.08 |

FOREIGN PATENT DOCUMENTS

| | | | | | |
|---|---|---|---|---|---|
| CN | 217720984 | | | 11/2022 | |
| CN | 217720984 | U | * | 11/2022 | |
| CN | 218997794 | | | 5/2023 | |
| CN | 218997795 | | | 5/2023 | |
| CN | 116526712 | A | * | 8/2023 | H02K 1/274 |

* cited by examiner

MOTOR ROTOR STRUCTURE AND MOTOR

CROSS-REFERENCE TO RELATED APPLICATION

This application claims the benefit of Chinese Patent Application Serial No. 202223032154.U filed Nov. 15, 2022, the contents of which application is herein incorporated by reference in its entirety.

FIELD OF THE INVENTION

The invention relates to the technical field of motor parts, in particular to a motor noise reduction rotor structure and an electric motor.

BACKGROUND OF THE INVENTION

In recent years, with the development of power electronic technology, computer technology and automatic control technology, servo control systems have been more and more widely used in many high-tech fields. As the power component of servo control systems, AC servo motors have the advantages of high control accuracy, good torque frequency characteristics, overload capacity and good acceleration performance. However, there is a problem of Cogging torque in motors. The Cogging torque is the torque generated by the interaction between the permanent magnet and the stator core when the permanent magnet motor winding is not energized. It is caused by the tangential component of the interaction between the permanent magnet and the armature teeth. The Cogging torque will cause the motor to produce vibration and noise, resulting in speed fluctuations, making the motor unable to operate smoothly and affecting the performance of the motor.

The existing Chinese utility model with application number CN2177202984U discloses a device for integrating multiple materials of magnetic tiles, including a magnetic steel assembled on a stator core, with a shaft hole arranged in the center of the iron core; The outer ring of the iron core is provided with several magnetic tile grooves distributed in a circular pattern, which are opened from the outside to the inside. The spacing between the magnetic tile grooves and the magnetic tile grooves is a magnetic tile clamp, and the magnetic tile grooves are equipped with various combinations of magnetic steel of different lengths and specifications.

The existing technical solutions mentioned above balance the performance and cost of the motor through a combined magnetic steel structure, but still use a relatively conventional magnetic tile groove structure. By changing the structure of the magnetic tile groove, further refined adjustments can be made to improve the performance of the motor on the basis of changing the magnetic steel.

SUMMARY OF THE INVENTION

The technical problem to be solved by the invention is to address the shortcomings of existing technology and propose a motor rotor structure and motor that effectively ensures the improvement of rotor dynamic balance, magnetic circuit characteristics, and heat dissipation capacity through structural design.

In order to achieve the above objectives, the motor rotor structure designed by this invention includes a rotor iron core, which is composed of a rotor section. The circumference of the rotor section is uniformly distributed with magnetic tile grooves. The magnetic tile grooves are located near the axis of the rotor section and are connected to two protruding edges extending towards the periphery of the rotor section. There is a limit protrusion protruding towards the periphery of the rotor section between the two raised edges. This design structure adopts a limiting protrusion, which enables the permanent magnet to be stably placed in the magnetic tile groove, limiting its displacement during rotation, and thus maintaining the stability of the motor. In addition, the limit protrusion only slightly increases the magnetic resistance, but can help achieve precise control of motor speed and reduce vibration and noise generated during operation. In addition, the gap between the limit and raised edges helps to prevent damage to the motor due to excessive heating and ensures long-term stable operation of the motor.

In order to further improve the performance of the rotor core, the rotor core is composed of multiple rotor segments, and the magnetic bearing slots on adjacent rotor segments are staggered. By designing magnetic tile grooves with relatively staggered settings, the magnetic circuit changes between multiple rotor segments are controlled, thereby reducing the noise and vibration of the motor and improving its working stability and lifetime.

A further solution is to have multiple rotor segments divided into two segments. This structure has relatively small changes compared to the original production process of the iron core, and has a slight increase in production costs, but there is a significant improvement in performance.

In order to further reduce the Cogging torque, the staggered angle of the magnetic tile grooves on the adjacent rotor segments 0.5°-7°. The staggered setting of magnetic bearing slots on adjacent rotor segments can reduce noise and vibration during motor operation, making the magnetic field of the motor more stable, and thereby improve the stability of motor operation.

In order to further change the electromagnetic characteristics of the rotor structure, the outer wall of the rotor section is uniformly distributed with a rotor skewing, and the axis of the rotor skewing is parallel to the axis of the rotor section. The setting of rotor skewing affects the reluctance and inductance of the motor, thereby meeting different application requirements and improving the efficiency of the motor.

In order to further reduce the Cogging torque, the connection between the midpoint of the side of the magnetic tile groove on the end face of the rotor section far from the center of the end face of the rotor section and the center of the end face of the rotor section is line A, and the connection between the midpoint of the rotor chute on the end face of the same rotor section and the center of the end face of the rotor section is line B, and the line A and line B are in an included angle relationship, and the included angle is 0°-1°. The advantage of this structure is that the magnetic tile grooves and rotor skewings are staggered. By designing the position relationship between the magnetic tile grooves and rotor skewings, the noise and vibration of the motor during operation are reduced, which can make the motor run more smoothly and improve the electrical performance of the motor. It should be noted that the staggered arrangement between the rotor skewing and the magnetic tile groove in the rotor section will inevitably result in changes in the corresponding angle relationship between the rotor skewing and the magnetic tile groove on the two rotor sections. This change can also further change the performance of the rotor core, making it suitable for the working state of special scenarios.

It is worth mentioning that the magnetic tile groove is equipped with various combinations of magnetic steel of different length specifications. Thus, the performance of the stator core can be further improved through the combination structure of magnetic steel.

At the same time, the invention provides a motor, which includes the motor rotor structure mentioned above.

The motor rotor structure and motor designed by this invention proved a brand new magnetic tile slot structure, which limits and fixes the magnetic steel by setting a limit protrusion on the magnetic tile slot. At the same time, the limit protrusion divides the bottom hole of the magnetic core at the bottom of the magnetic tile slot into two, making its layout more compact, improving the magnetic flux path and magnetic field distribution, and not losing heat dissipation effect. The motor using this type of motor rotor structure can avoid significant vibration and noise caused by excessive speed during operation, and can also adapt to various scenarios of precise speed control. In addition, the adjacent magnetic bearing slots set in a staggered manner and the rotor inclined slots and magnetic bearing slots set in a staggered manner on the end face of the same rotor section can further reduce vibration and noise. In summary, the invention has the characteristics of low noise and vibration, and can accurately control the rotational speed.

DETAILED DESCRIPTION OF PREFERRED EMBODIMENTS

Figure 1:
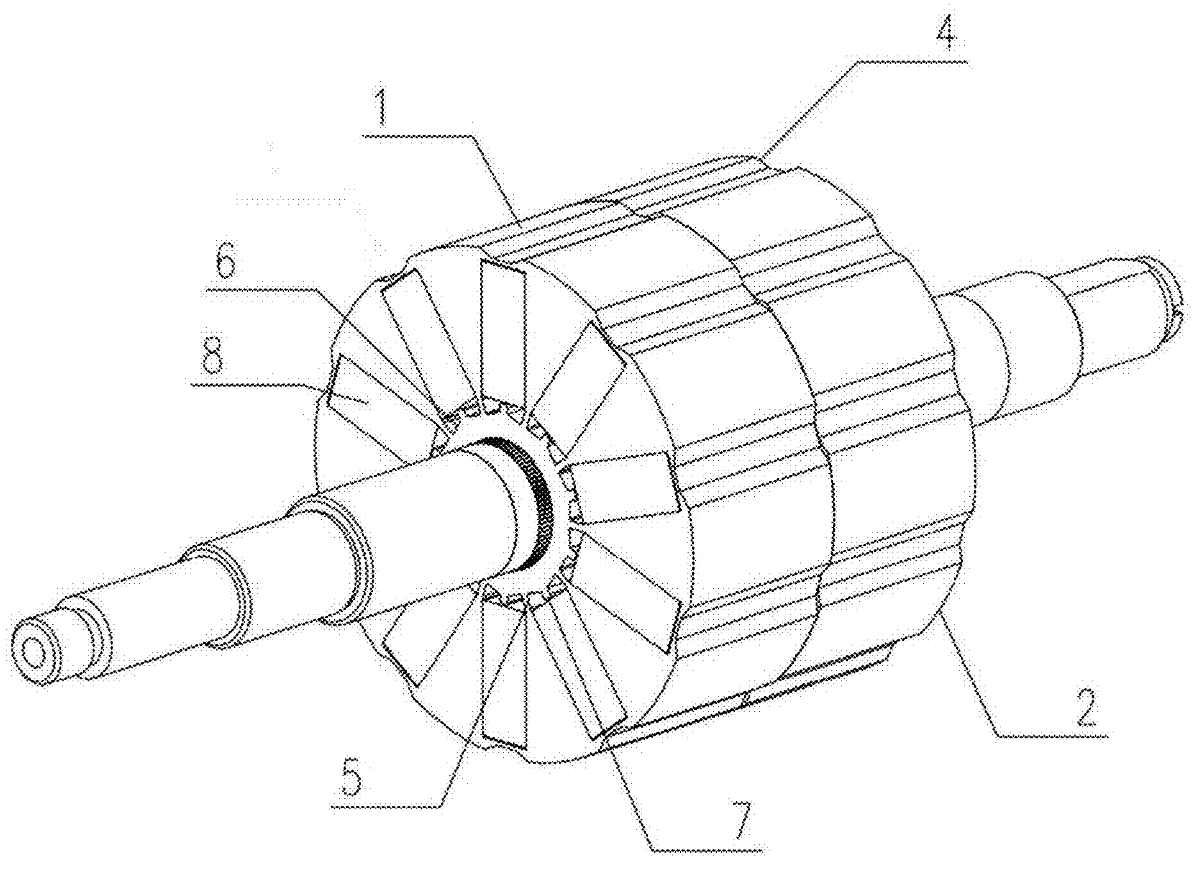
FIG. 1 is a schematic diagram of the invention.

The preferred embodiments of this invention are explained below in conjunction with the accompanying drawings. It should be understood that the preferred embodiments described here are only for the purpose of explaining and explaining this invention, and are not intended to limit it.

Example 1

As shown in FIGS. 1, 2, 3, and 4, the motor rotor structure described in this embodiment includes a rotor core 1, which is composed of a rotor section 2. The circumference of the rotor section 2 is uniformly distributed with a magnetic tile groove 3. The magnetic tile groove 3 is located near the axis of the rotor section 2, where two limit edges 5 shrink towards the axis of the rotor segment 2. The two limit edges 5 are connected to two protruding edges 6 extending towards the periphery of the rotor segment 2. There is a limit protrusion 7 protruding towards the periphery of the rotor section 2 between the two protruding edges 6.

Figure 2:
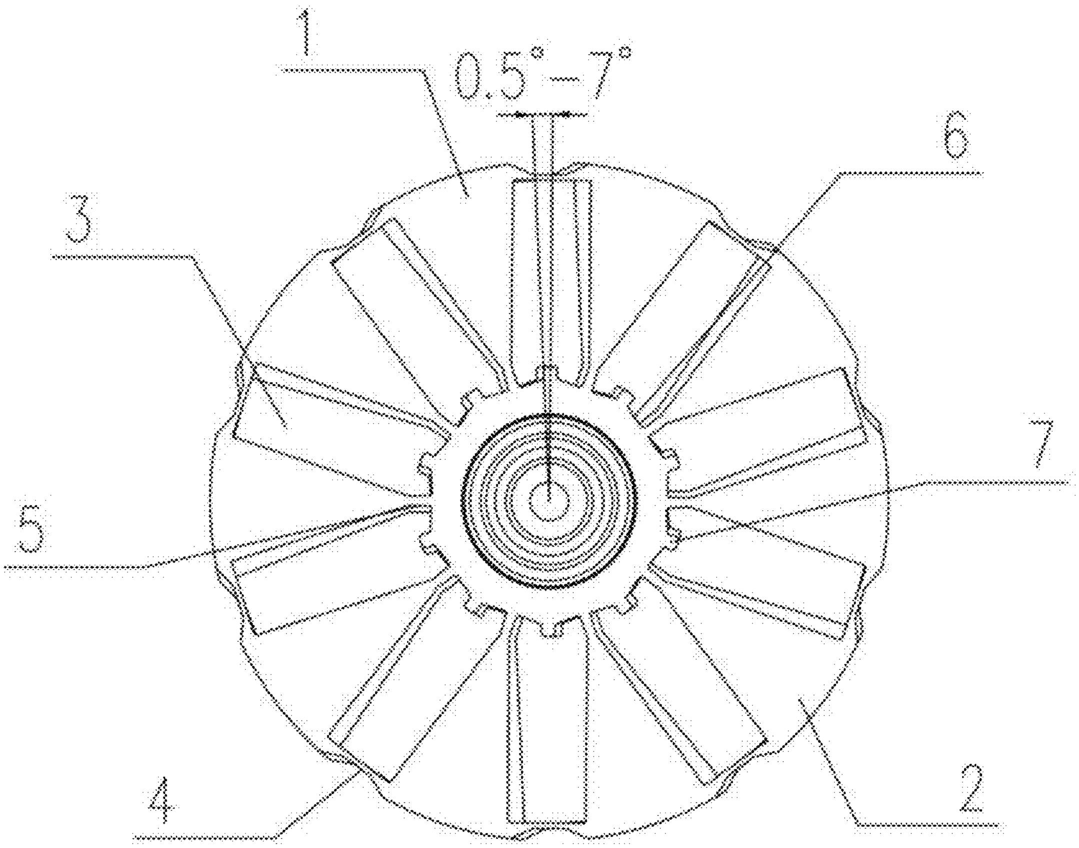
FIG. 2 is the front view of the invention.

As shown in FIG. 2, the rotor core 1 is composed of multiple rotor sections 2, and the magnetic tile groove 3 on adjacent rotor sections 2 are staggered by 0.5° to 7°, meaning that the two rotor segments are misaligned by 0.5° based on the axis. For common performance requirements, a stator core 2 is generally composed of two rotor sections 2. But this does not serve as a limit on the number of rotor sections 2. At the same time, there are no specific restrictions on the angle of misalignment, which can be set according to the actual performance needs.

As shown in FIG. 1, the outer wall of the rotor section 2 is uniformly distributed with a rotor skewing 4 on the circumference, and the axis of the rotor skewing 4 is parallel to the axis of the rotor section 2.

Figure 3:
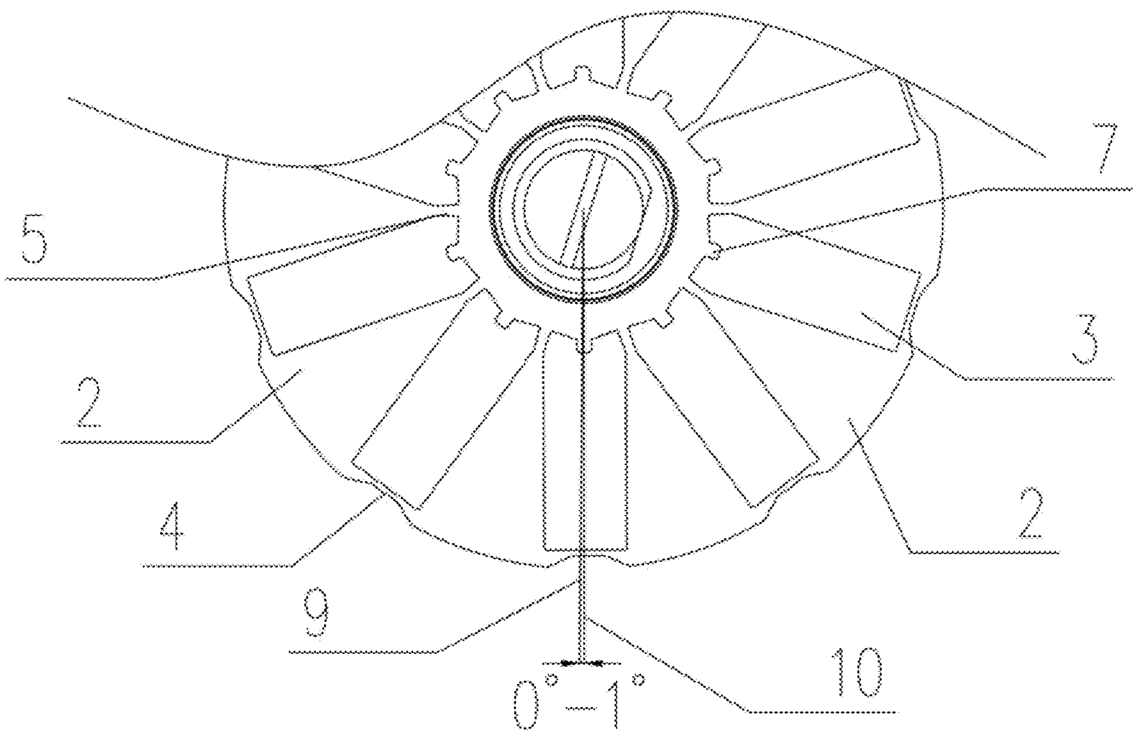
FIG. 3 is a schematic diagram of the staggered angle between the A and B segments of the invention.
Figure 4:
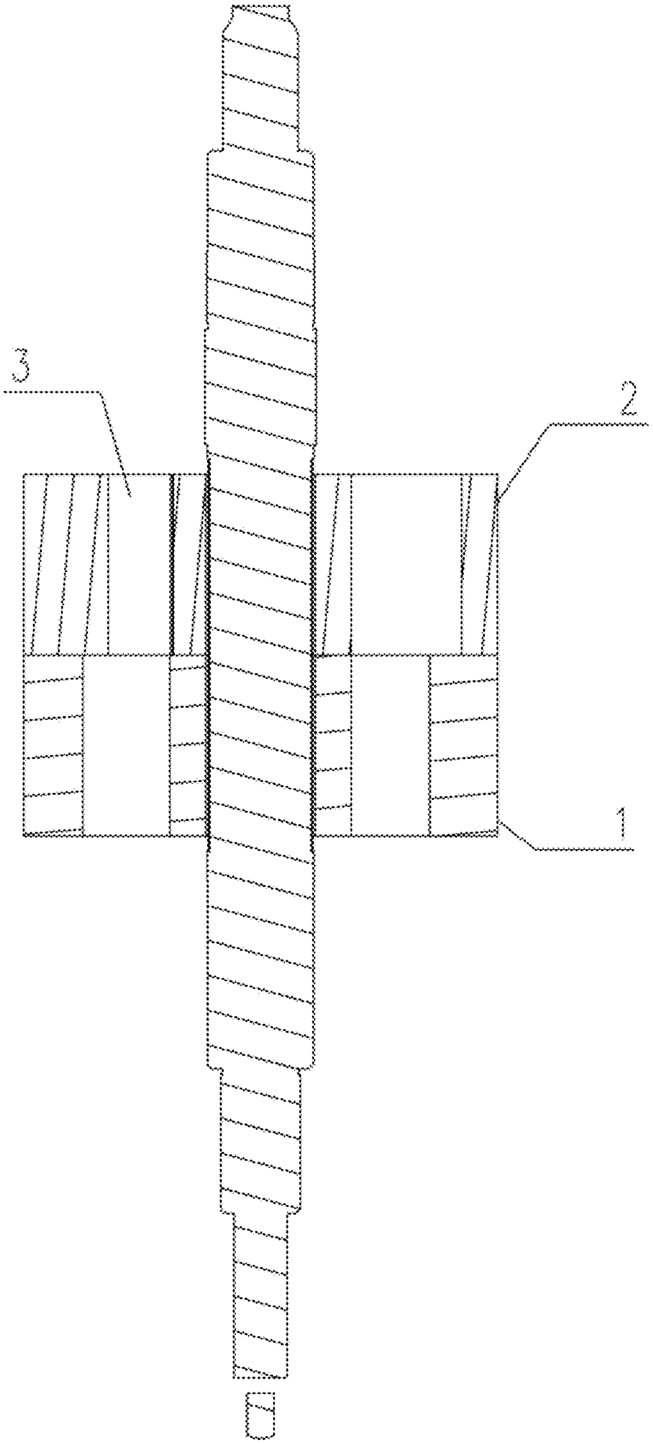
FIG. 4 is a cross-sectional view of the invention. Among them: rotor core 1, rotor section 2, magnetic tile groove 3, rotor skewing 4, limit edge 5, protruding edges 6, limit protrusion 7, magnetic steel 8, A section 9, B section 10.

As shown in FIG. 3, the connecting line between the midpoint of the magnetic tile groove 3 on the side away from the center of the rotor section 2 on the rotor section 2 surface and the center of the rotor section 2 surface is A line segment 9. The connecting line between the midpoint of the rotor skewing 4 on the same rotor section 2 surface and the center of the rotor section 2 surface is B line segment 10. The A line segment 9 and B line segment 10 have an included angle relationship, and the included angle is 0°-1°, that is, the magnetic tile groove 3 and the rotor skewing 4 on the same rotor section 2 are misaligned 0-1° with the axis as the reference.

In some embodiments, when viewed from one end face of the rotor core 1, the magnetic tile groove 3 between the two rotor sections 2 is staggered by 1°, that is, the magnetic tile groove 3 of the second rotor section 2 deviates clockwise by 1° compared to the magnetic tile groove 3 of the first rotor section 2. However, the rotor skewing 4 on the first rotor section 2 deviates clockwise by 0.5° from the magnetic tile groove 3 of that section 2, and the rotor tile groove 3 on the second rotor section 2 deviates counterclockwise by 0.5° from the magnetic tile groove 3 of that section 2. When viewed from the side of the rotor core 1, the contour lines formed by the rotor skewing 4 on the two segments of rotor section 2 and both ends can be connected to form a line without deviation.

In some embodiments, when viewed from one end face of the rotor core 1, the magnetic tile groove 3 between the two rotor sections 2 is staggered by 7°, meaning that the magnetic tile groove 3 of the second rotor section 2 deviates clockwise by 7° compared to the magnetic tile groove 3 of the first rotor section 2. However, the rotor skewing 4 on the first rotor section 2 deviates clockwise by 1° from the magnetic tile groove 3 of that section 2 and rotor groove 3 on the second rotor section 2 deviates clockwise by 1° from the magnetic tile groove 3 of that section 2. When viewed from the side of the rotor core 1, the contour lines formed by the rotor slot 4 on the two ends of rotor section 2 are actually deviated by 9° relative to each other, and can be combined with the magnetic tile groove 3 to form a stepped spiral arrangement.

The above two types of magnetic tile grooves 3 and rotor skewing 4, as well as the combined structure of the two rotor sections 2, can be combined into various forms corresponding to the performance design needs, thus achieving various rotor core structures that meet requirements.

In some embodiments, the magnetic steel 8 includes magnetic tiles made of two different materials, selected as a combination of aluminum nickel cobalt material and ferrite material or a combination of aluminum nickel cobalt material and neodymium iron boron material.

In some embodiments, the magnetic steel 8 includes magnetic tiles with three different materials, selected as aluminum nickel cobalt material, samarium cobalt material and ferrite material combination, or a aluminum nickel cobalt material, samarium cobalt material and ferrite material combination, or aluminum nickel cobalt material, neodymium iron boron material and samarium cobalt material combination, or samarium cobalt material, neodymium iron boron material and ferrite material combination.

Example 2

The motor described in this embodiment includes the motor rotor structure shown in Example 1. The motor rotor structure forms a plurality of mutually deviated Cogging torque through staggered magnetic tile grooves to reduce the vibration and noise generated by motor operation. The specific implementation can refer to FIGS. 1-3, which will not be repeated here.

In the description of this invention, it should be noted that the terms “vertical”, “up”, “down”, “horizontal”, etc. indicate the orientation or position relationship based on the orientation or position relationship shown in the attached drawings, only for the convenience of describing this invention and simplifying the description, rather than indicating or implying that the device or component referred to must have a specific orientation. Therefore, it cannot be understood as a limitation on the present invention.

In the description of this invention, it should also be noted that unless otherwise specified and limited, the terms “setting”, “installation”, “connection”, and “connection” should be broadly understood, for example, they can be fixed connections, detachable connections, or integrated connections; It can be a mechanical connection or an electrical connection; It can be directly connected, or indirectly connected through an intermediate medium, or it can be the internal connection between two components. For ordinary technical personnel in this field, the specific meanings of the above terms in this invention can be understood based on specific circumstances.

Finally, it should be noted that the above is only a preferred embodiment of this invention and is not intended to limit it. Although the invention has been described in detail with reference to the aforementioned embodiments, for those skilled in the art, they can still modify the technical solutions recorded in the aforementioned embodiments or replace some of their technical features equally. Any modifications, equivalent replacements, improvements, etc. made within the spirit and principles of this invention shall be included in the scope of protection of this application and of the claims appended hereto.

What is claimed is:

1. A motor rotor structure comprising:

a rotor iron core comprising a plurality of rotor sections arranged along an axial direction; and a plurality of magnetic tile grooves uniformly distributed on a circumference of each rotor section;

wherein magnetic tile grooves on adjacent ones of the plurality of rotor sections are circumferentially offset from one another at a joint surface between the adjacent rotor sections;

wherein the magnetic tile grooves of the adjacent rotor sections are staggered at an angle of 0.5° to 7°;

wherein an outer wall of each rotor section is uniformly formed with rotor skewing; and wherein a first connection line between a midpoint of a first magnetic tile groove on an end face of the rotor section and a center of the end face of the rotor section, and a second connection line between a midpoint of a bottom edge of the rotor skewing on a same end face of the rotor section and the center of the end face of the rotor section have an included angle of 0° to 1°.

2. The motor rotor structure according to claim 1, wherein the plurality of rotor sections comprises two rotor sections.

3. The motor rotor structure according to claim 2, wherein the plurality of magnetic tile grooves is configured to receive magnetic steel elements of different lengths.

4. The motor rotor structure according to claim 1, wherein the plurality of magnetic tile grooves is configured to receive magnetic steel elements of different lengths.

5. An electric motor comprising a motor rotor structure as described in claim 1.

* * * * *